(12) United States Patent
Igarashi

(10) Patent No.: US 9,048,481 B2
(45) Date of Patent: Jun. 2, 2015

(54) BATTERY HOUSING DEVICE

(75) Inventor: Youichi Igarashi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 895 days.

(21) Appl. No.: 13/112,686

(22) Filed: May 20, 2011

(65) Prior Publication Data

US 2011/0293979 A1     Dec. 1, 2011

(30) Foreign Application Priority Data

May 26, 2010   (JP) .................................. 2010-120611

(51) Int. Cl.
*H01M 2/10* (2006.01)

(52) U.S. Cl.
CPC .......... *H01M 2/1077* (2013.01); *H01M 2/1072* (2013.01); *H01M 2/1083* (2013.01)

(58) Field of Classification Search
USPC ..................................................... 429/96–100
See application file for complete search history.

(56) References Cited

U.S. PATENT DOCUMENTS

2009/0239134 A1 *   9/2009   Tseng ........................... 429/100

FOREIGN PATENT DOCUMENTS

| GB | 2 297 645 A | 8/1996 | |
|---|---|---|---|
| JP | 55-64274 U | 11/1979 | |
| JP | 62-012262 U | 1/1987 | |
| JP | 11-045691 A | 2/1999 | |
| JP | 11-126592 A | 5/1999 | |
| JP | 2001-210290 A | 8/2001 | |
| JP | 2004-199957 A | 7/2004 | |
| JP | 2008-293874 | * 12/2008 | .............. H01M 2/10 |
| JP | 2009-277513 A | 11/2009 | |
| JP | 2010-040243 A | 2/2010 | |

OTHER PUBLICATIONS

Office Action dated Oct. 9, 2012, issued by the Japanese Patent Office in counterpart Japanese Patent Application No. 2010-120611.
European Search Report, dated Aug. 17, 2011, issued in Application No. 11167028.7.

* cited by examiner

*Primary Examiner* — Ula C Ruddock
*Assistant Examiner* — Osei Amponsah
(74) *Attorney, Agent, or Firm* — Sughrue Mion, PLLC

(57) ABSTRACT

A battery housing device includes a case configured to house a battery and having a plus terminal and a minus terminal, a plus pole spring provided in the case and having one end connected to the plus terminal and an opposite end configured to come in contact with a plus pole of the battery, a minus pole spring provided in the case and having one end connected to the minus terminal and an opposite end configured to come in contact with a minus pole of the battery, and a battery support configured to support a bottom face of the battery and to support a side wall of the battery. The battery can be attached to and detached from the battery support in a length direction of the battery.

7 Claims, 3 Drawing Sheets

PRIOR ART

BATTERY HOUSING DEVICE

TECHNICAL FIELD

The present disclosure relates to a battery housing device including a case having a plus terminal and a minus terminal and housing a battery, a plus pole spring provided in the case and having one end connected to the plus terminal and an opposite end coming in contact with a plus pole of the battery, and a minus pole spring provided in the case and having one end connected to the minus terminal and an opposite end coming in contact with a minus pole of the battery. In particular, the present disclosure relates to a battery housing device which is resistant to vibration and shock, can prevent performance degradation of a battery, and enables easy replacement of a battery.

Specifically, the present disclosure relates to a battery housing device (battery pack) for housing a battery used to conduct wireless communications in a wireless communication differential pressure transmitter and a temperature transmitter, etc., of field device products and relates to a battery housing device for fixing a battery in the battery housing device using silicone rubber and PC (polycarbonate) resin sheet.

The present disclosure relates to a structure which is resistant to vibration and shock, prevents performance degradation of the battery, and facilitates replacement of a battery in the battery housing device according to the fixing method.

RELATED ART

In a battery pack (battery housing device) for a battery used to conduct wireless communications in a wireless communication differential pressure transmitter and a temperature transmitter, a plus pole and a minus pole of the battery are pressed by a fix terminal having no spring property or a coil spring, plate spring, thereby fixing the battery.

FIG. 3 is a configuration drawing of an example of a related-art battery housing device.

In FIG. 3, a battery housing device 1 has a case main body 2 and a cover 3.

Batteries 4 and 5 are housed in the battery housing device 1. For example, the batteries 4 and 5 are D batteries.

The batteries 4 and 5 are connected in series as a plus pole of the battery 4 connected to a plus pole coil spring 21a and a minus pole of the battery 5 is connected to a minus pole coil spring 22a.

The batteries 4 and 5 supply power from connector parts 12 and 13 through a circuit board 6 having a plus pole coil spring 22b connected to a plus pole of the battery 5 and a minus pole coil spring 21b connected to a minus pole of the battery 4.

For example, conical coil springs are used as the plus pole coil springs 21a and 22b and spring crests come in contact with convex parts of the plus poles of the batteries.

For example, cylindrical coil springs are used as the minus pole coil springs 22a and 21b. Each of the minus pole coil springs 22a and 21b has a larger inner diameter than the convex part of the plus pole of the battery so as not to come in erroneous contact with the convex part of the plus pole of the battery and comes in contact with the minus pole of the battery.

The case main body 2 is fixed to the cover 3 with screws and the batteries 4 and 5 are housed in the battery housing device.

Consequently, in the related-art battery housing device, the plus pole and the minus pole of each battery are pressed by the coil springs, etc., thereby fixing the battery.

Patent Document 1, etc., describes such a related-art battery housing device.

RELATED ART DOCUMENT

Patent Document

[Patent Document 1] Japanese Patent Laid-Open No. 2009-277513

In the related-art battery housing device, if joint (screwing) of the case main body 2 and the cover 3 is removed battery replacement can be facilitated; however, when the pressing force of the springs of the minus pole coil spring, etc., and fixing of internal face parts of the case main body 2 and the cover 3 are only adopted, the structure is not resistant to vibration or shock and thus there is a problem in that performance degradation of the battery occurs.

The performance degradation is mainly caused to occur due to vibration and shock; it occurs because of destruction of a power generation element in the battery, destruction of an electric power collecting mechanism from an electrode to an external terminal.

Specifically, charging and discharging are performed in the battery, whereby an active substance of a pole plate is repeatedly expanded and shrunken; if a gap produced at the expanding time becomes a crack because of external vibration and shock and active substance for storing electricity drops, performance degradation of output voltage lowering, etc., occurs.

That is, the related-art battery housing device is not resistant to vibration or shock in the structure in FIG. 3 and thus there is a problem in that performance degradation of the battery such as output voltage lowering occurs.

On the other hand, lately, to provide a structure resistant to vibration and shock, a structure wherein a silicone-based elastic body is placed in all or a part of places where a battery and a battery case can come in contact with each other and a buffer function between the battery and the battery case is held, a structure wherein a vibration and shock absorption section for elastically abutting an end surface of an electric cell fitted into a battery holding section and absorbing vibration and shock, and the like are discussed, for example, as described in Japanese Patent Laid Open No. Hei. 11-45691 and Japanese Patent Laid Open No. 2010-40243.

However, in the structure in Japanese Patent Laid Open No. Hei. 11-45691, to place the silicone-based elastic body (buffer material), an O ring is fitted into the periphery of the buttery and the battery is adhered and fixed to the battery case with a sealant and thus there is a problem in that much labor and time are taken for battery replacement.

In the structure in Japanese Patent Laid Open No. 2010-40243, there is a problem in that battery replacement cannot be facilitated because an assembly structure is complicated.

SUMMARY

Exemplary embodiments of the present invention provide a battery housing device which is resistant to vibration and shock, can prevent performance degradation of a battery, and enables easy replacement of a battery.

A battery housing device according to a first aspect of the invention comprises:

a case configured to house a battery and having a plus terminal and a minus terminal;

a plus pole spring provided in the case and having one end connected to the plus terminal and an opposite end configured to come in contact with a plus pole of the battery;

a minus pole spring provided in the case and having one end connected to the minus terminal and an opposite end configured to come in contact with a minus pole of the battery; and a battery support configured to support a bottom face of the battery and to support a side wall of the battery, wherein the battery can be attached to and detached from the battery support in a length direction of the battery.

According to a second aspect of the invention, in the battery housing device of the first aspect, the battery support comprises at least one battery fixing part comprising a hole through which one of the plus pole spring or the minus pole spring is connected to the battery, and comprising a plurality of fixing members configured to be placed in a margin of the bottom face of the battery and to support the bottom face of the battery when the battery is inserted, and at least one side wall support part formed like a plate extending in the length direction of the battery, joined to one end of the battery fixing part, and configured to come in contact with the side wall of the battery and to support the battery.

According to a third aspect of the invention, in the battery housing device of the second aspect, the case is configured to house two batteries in parallel, the battery support comprises two battery fixing parts joined at one end to each other, and the side wall support part joins with a joined portion of the battery fixing parts and is formed like the plate extending in the length direction of the battery in all or a part of place where the batteries can come in contact with each other.

According to a fourth aspect of the invention, in the battery housing device of the second aspect, the case is configured to house a plurality of batteries, the battery support comprises a plurality of battery fixing parts and each of the battery fixing parts is joined at least at one end of another battery fixing part, and the battery support comprises a plurality of side wall support parts and each of the side wall support parts joins with at least any of the battery fixing parts in a joined portion of the battery fixing parts.

According to a fifth aspect of the invention, in the battery housing device of any of the first to fourth aspects, the battery fixing part is formed of a rubber material, and the side wall support part comprises a flat plate formed of a rubber material and rigid side wall support members attached to a part or all of both faces of the flat plate.

According to a sixth aspect of the invention, in the battery housing device of any of the first to fifth aspects, the case comprises a first case member wherein the battery support is disposed, the first case member comprising at least either the minus pole spring or the plus pole spring, and a second case member comprising at least either the plus pole spring or the minus pole spring. After the battery support is inserted into the first case member, the battery is inserted into the first case member, and then the first case member and the second case member are fixed.

According to the battery housing device of the exemplary embodiment, the battery housing device includes the battery support for supporting the bottom face of the battery and the side wall of the battery and the battery can be attached to and detached from the battery support in the length direction of the battery, whereby the battery housing device becomes resistant to vibration and shock and can prevent performance degradation of the battery.

According to the battery housing device of the exemplary embodiment, the battery housing device has the wide wall support part formed by attaching the rigid member to both faces of the rubber flat plate part formed extending from the joint part of the battery fixing parts forming the battery support to space between the batteries, whereby rubber deformation at the battery inserting time is prevented and the battery can be easily inserted.

According to the exemplary embodiment, the case of the battery housing device includes the first case member including at least either the minus pole spring or the plus pole spring wherein the battery support is disposed and the second case member including at least either the plus pole spring, or the minus pole spring, wherein after the battery support is inserted into the first case member, the battery is inserted into the first case member and then the first case member and the second case member are fixed. Therefore, the first case member and the second case member are screwed and fixed or the screw is removed and the batteries can be attached and detached in the length direction of the batteries, whereby the battery housing device is effective in that the batteries can be easily replaced without fitting an O ring into the battery periphery and without adhering and fixing the batteries to the battery case with a sealant as in the related art.

According to the exemplary embodiment, If having a capacitor for ensuring electric capacitance at the instantaneous interruption time between a battery and a terminal is not permitted because of explosion proof standard, coil springs or plate springs are adopted as terminals on both pole sides of the battery, whereby the battery housing device of the invention is also effective in that the coil springs or the plate springs follow motion of the battery occurring at vibration acceleration not only in a stationary state, but also in a vibration state and contact can be always kept. Therefore, there can be provided the battery housing device which do not cause instantaneous interruption or a contact failure between the battery and the terminal to occur and can prevent a contact error in the vibration state.

According to the exemplary embodiment, the plus pole of the battery is electrically insulated except for the convex part and the spring crest inner diameter of the cylindrical coil spring of the minus pole (or convex part circumventing hole formed in minus pole plate spring) is larger than the convex part of the battery plus pole. Thus, to use the batteries for a wireless communication device in an erroneous insertion (inverse insertion) state, an overcurrent does not occur in the batteries and a failure of abnormal heating of the battery or liquid leakage does not occur in the battery housing device.

According to the exemplary embodiment, the battery support comprises two battery fixing parts joined at one end to each other, the side wall support part joins with the joint portion of the battery fixing parts and is formed like a plate extending in the length direction of the battery in all or a part of place where the batteries can come in contact with each other in the joint portion of the battery fixing parts, and two batteries are housed in parallel, whereby the battery housing device becomes resistant to vibration and shock and can prevent performance degradation of the battery, and rubber deformation at the battery inserting time is prevented, the battery can be easily inserted, and two batteries can be arranged and housed in parallel.

According to the exemplary embodiment, the battery support includes a plurality of battery fixing parts, the battery fixing parts are joined at least at one end of another battery fixing part, the plurality of side wall support parts join with at least any of the battery fixing parts in the joint portion of the battery fixing parts and are formed like a plate extending in the length direction of the battery in all or a part of place where the batteries can come in contact with each other, and a plurality of batteries are housed, whereby the battery housing device becomes resistant to vibration and shock and can prevent performance degradation of the battery, and rubber deformation at the battery inserting time is prevented, the battery can be easily inserted, and a plurality of batteries can be arranged and housed in a plurality of rows.

DETAILED DESCRIPTION

First Embodiment

Figure 1A:
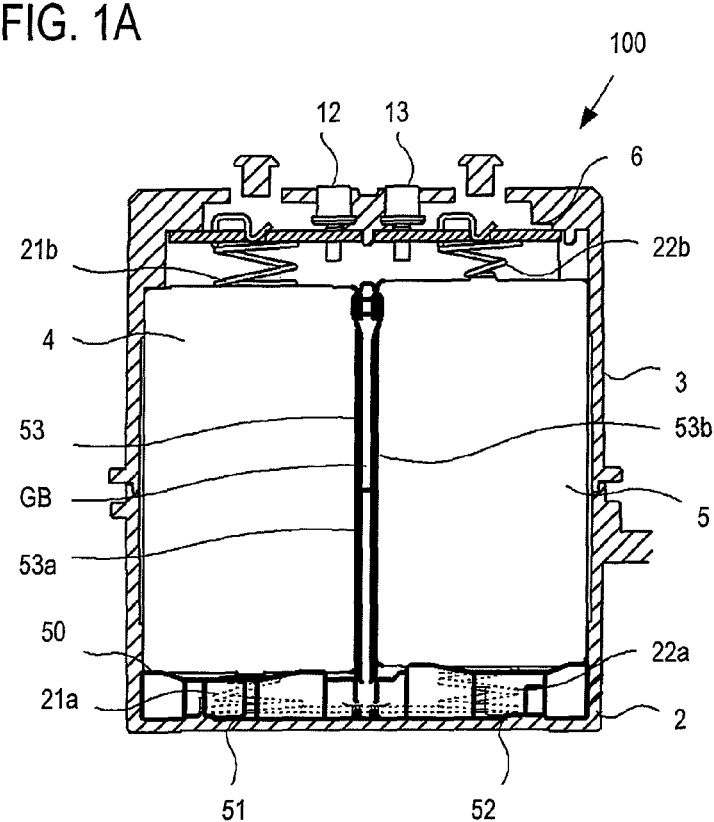
FIGS. 1A and 1B are configuration drawings of one embodiment of a battery housing device according to the invention.
Figure 1B:
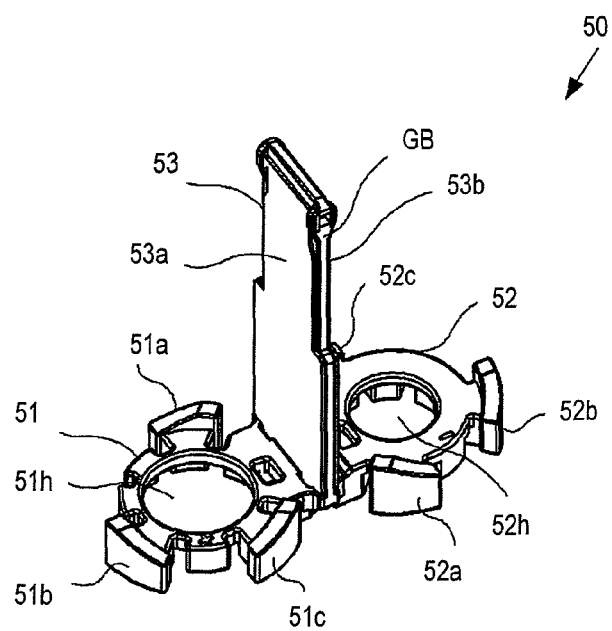
Figure 2:
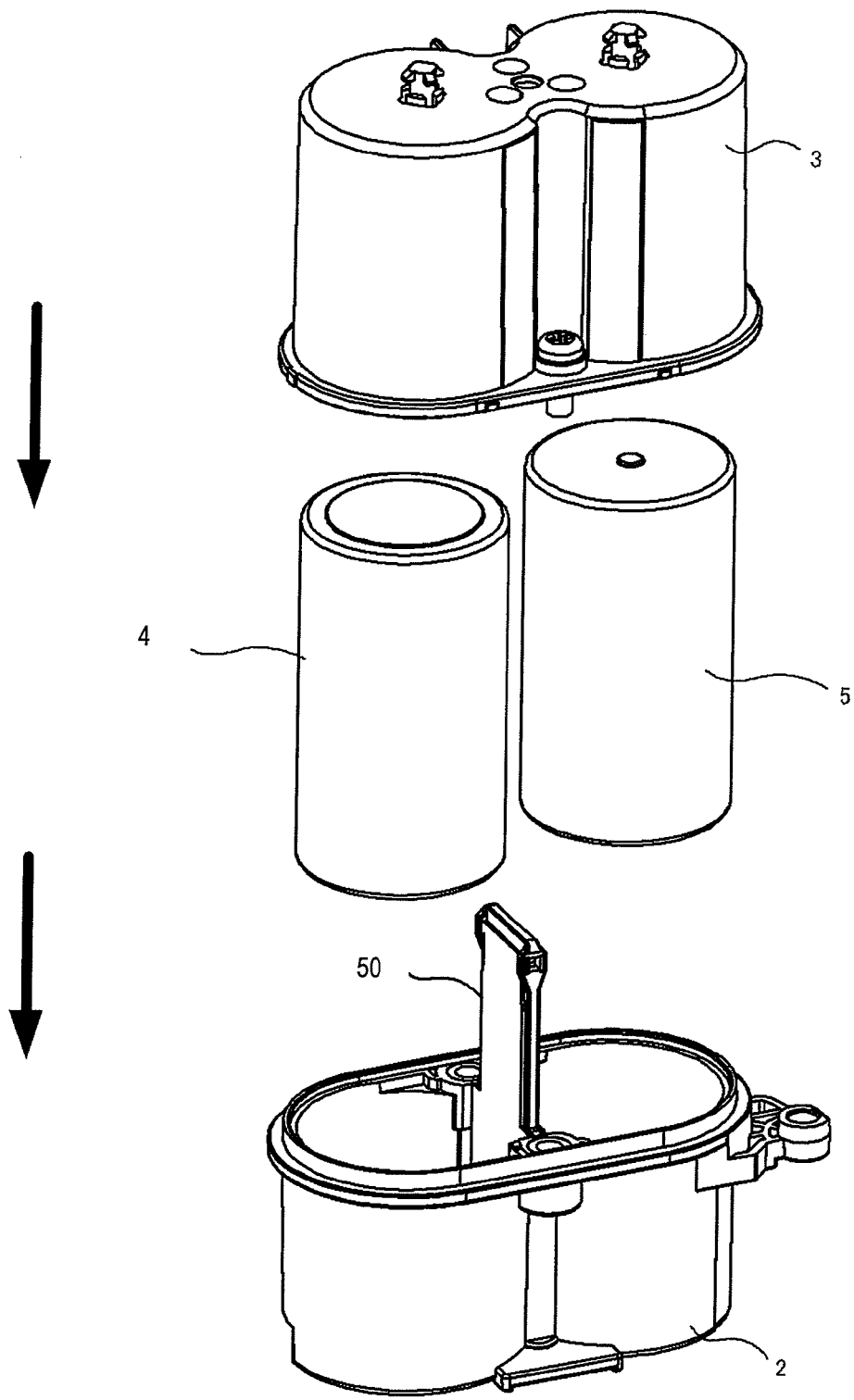
FIG. 2 is a schematic representation of assembly of the battery housing device in FIG. 1.
Figure 3:
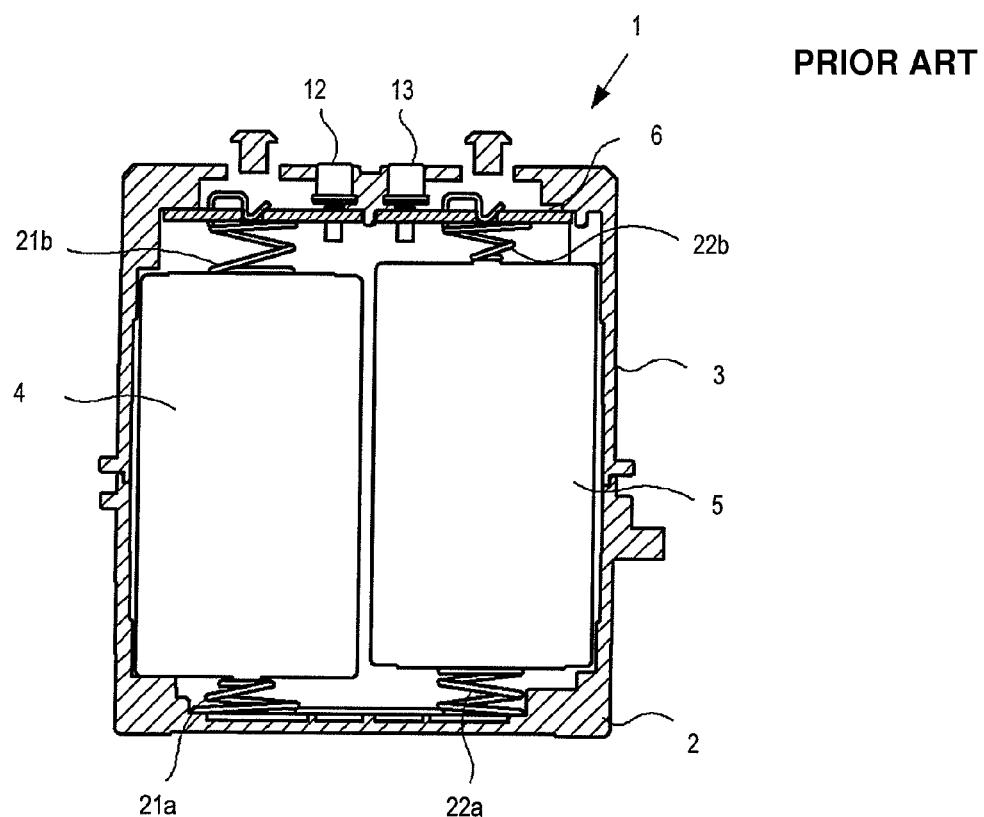
FIG. 3 is a configuration drawing of an example of a related-art battery housing device.

FIGS. 1A and 1B are configuration drawings of one embodiment of a battery housing device according to the invention. FIG. 2 is a schematic representation of assembly of the battery housing device in FIG. 1. Parts common to those in FIG. 3 are denoted by the same reference numerals in FIGS. 1A and 1B and will not be discussed again as required. FIG. 1A is a configuration example of the battery housing device and FIG. 1B is perspective view of a battery support.

The battery housing device of the embodiment differs from that in FIG. 3 mainly in that the battery housing device includes a battery support for clamping a bottom face of a battery and supporting side walls of the battery and that the battery can be attached to and detached from the battery support in the length direction of the battery.

(Description of Configuration)

In FIG. 1A, a battery housing device 100 according to the invention is mainly made up of a case main body 2 of an example of a first case member, a cover 3 of an example of a second case member, and a battery support 50 for supporting bottom faces of batteries 4 and 5 and supporting side walls of the batteries 4 and 5.

The batteries 4 and 5 are, for example, cylindrical batteries of D batteries, etc., or batteries of any other shape, etc., and are housed detachably from the battery support 50 in the length direction of the batteries.

(Description of Main Components)

The case main body 2 is shaped like a box of a size that can house the batteries 4 and 5 and has an opening part for housing and taking out the batteries 4 and 5 on the top.

The case main body 2 includes springs for fixing and electrically connecting the batteries 4 and 5, such as a plus pole coil spring 21a and a minus pole coil spring 22a on a bottom face of an inner wall. The case main body 2 includes a plus terminal and a minus terminal and one end of the plus pole coil spring 21a is connected to the plus terminal and one end of the minus pole coil spring 22a is connected to the minus terminal.

The case main body 2 is formed by molding a synthetic resin, for example.

The one end of the plus pole coil spring 21a is electrically connected to the one end of the minus pole coil spring 22a. The plus pole coil spring 21a and the minus pole coil spring 22a may be integrally molded using metal, etc.

At the battery inserting time, an opposite end of the plus pole coil spring 21a is electrically connected to a plus pole of the battery 4 and an opposite end of the minus pole coil spring 22a is electrically connected to a minus pole of the battery 5.

The cover 3 is a lid part of the case main body 2 and is shaped like a box of a size that can house the batteries 4 and 5 and has an opening part for covering the batteries 4 and 5 and fitting into the case main body 2 in a lower part.

The cover 3 includes springs for fixing and electrically connecting the batteries 4 and 5, such as a minus pole coil spring 21b and a plus pole coil spring 22b on a bottom face of an inner wall.

The cover 3 also includes a circuit board 6 including the minus pole coil spring 21b, the plus pole coil spring 22b, and connector parts 12 and 13 for supplying power supplied from the batteries 4 and 5. The opposite end of the plus pole coil spring 22b is connected to a plus terminal formed on the circuit board 6 and the opposite end of the minus pole coil spring 22a is connected to a minus terminal formed on the circuit board 6.

The cover 3 is formed by molding a synthetic resin, for example.

At the battery inserting time, the opposite end of the minus pole coil spring 21b is electrically connected to a minus pole of the battery 4 and the opposite end of the plus pole coil spring 22b is electrically connected to a plus pole of the battery 5.

The battery support 50 is, for example, a silicone rubber molded article and is made up of a battery fixing part 51 for supporting an end part of the battery 4 (bottom face, vicinity of bottom face), a battery fixing part 52 for supporting the bottom face of the battery 5, and a side wall support part 53 for supporting side walls of the batteries 4 and 5.

That is, the battery support 50 clamps and fixes the bottom faces of the batteries 4 and 5 by the battery fixing parts 51 and 52 and supports the side walls of the batteries 4 and 5 by the side wall support part 53 (for example, supports the side walls so that the batteries do not come in contact with each other).

The battery fixing part 51 is formed as a shape similar to the bottom face of the battery 4 or a shape of a larger size than the bottom face of the battery 4 and includes a plurality of fixing members 51a, 51b, and 51c placed in a margin of the bottom (peripheral margin, etc.,) of the battery 4 for supporting the bottom face of the battery 4 when the battery is inserted and a hole 51h of a shape larger than the connection portion of the spring (plus pole coil spring 21a) and the battery 4.

The battery fixing part 52 is formed as a shape similar to the bottom face of the battery 5 or a shape of a larger size than the bottom face of the battery 5 and includes a plurality of fixing members 52a, 52b, and 52c placed in a margin of the bottom (peripheral margin, etc.,) of the battery 5 for clamping the bottom face of the battery 5 when the battery is inserted and a hole 52h of a shape larger than the connection portion of the spring (minus pole coil spring 22a) and the battery 5.

When the case 2 and the cover 3 are combined after battery insertion, the battery fixing parts 51 and 52 press and support the battery in the length direction (axial direction of the battery) from the battery bottom face. In other words, the battery is clamped in the axial direction of the battery by the battery fixing part placed in the battery bottom part and the spring.

The fixing members 52a, 52b, and 52c of the battery fixing part 52 may press and clamp the battery in the radius direction (toward the axis of the battery) or may simply support the battery to fix the position of the bottom face of the battery 5. Likewise, the fixing members 51a, 51b, and 51c of the battery fixing part 51 may press and clamp the battery 4 in the radius direction of the bottom face of the battery 4 (toward the axis of the battery) or may simply support the battery.

The battery fixing parts 51 and 52 are not limited to silicone rubber molded article and may be formed of any other rubber material.

Any number of the fixing members may be formed in the margins of the battery fixing parts 51 and 52 if they clamp the bottom parts of the batteries 4 and 5.

The battery fixing parts 51 and 52 are joined at one end.

A rubber flat plate part GB formed of a rubber material, extending in the length direction of the batteries 4 and 5, and formed like a flat plate is formed in the joint portion of the battery fixing parts 51 and 52.

In other words, the rubber flat plate part GB is formed like a flat plate extending in the perpendicular direction on the faces of the battery fixing parts 51 and 52 and is formed between the batteries 4 and 5 at the battery insertion time.

The side wall support part 53 is a polycarbonate (PC sheet) component, is joined to one end of the battery fixing parts 51 and 52, is formed like a plate extending in the length direction of the battery 4, 5, and comes in contact with the side wall of the battery 4, 5 for supporting the battery 4, 5.

Specifically, the side wall support part 53 is formed by attaching side wall support members 53a and 53b of rigid PC sheet components to both faces of the rubber flat plate part GB formed between the batteries 4 and 5 of the battery fixing parts 51 and 52.

For example, the side wall support members 53a and 53b of the side wall support part 53 come in contact with the side walls of the batteries 4 and 5 (for example, a part of an outer peripheral surface) for supporting the batteries 4 and 5.

The side wall support part 53 is not limited to a PC sheet component and may be formed of any other resin or metal.

(Description of Function and Advantages of Battery Support 50)

The functions and the advantages of the battery fixing parts 51 and 52 of the battery support 50 will be discussed.

To reliably house the batteries 4 and 5 in the case main body 2 and the cover 3, a gap needs to be provided between the battery and the cover and between the battery and the case main body because there are variations in the sizes of the batteries 4 and 5 and the shapes of the cover 3 and the case main body 2.

The battery fixing parts 51 and 52 have a buffer function of eliminating the gap between the battery 4, 5 and the cover 3 and the gap between the battery 4, 5 and the case main body 2 while fixing the batteries.

That is, the battery housing device 100 of the invention is resistant to vibration and shock and can prevent performance degradation of the batteries as the battery fixing parts 51 and 52 press (support) the batteries in the length direction from the bottom faces of the batteries.

Next, the necessity, the function, and the advantage of the side wall support part 53 of the battery support 50 will be discussed.

The battery fixing parts 51 and 52 support the batteries 4 and 5 and serve the buffer function, but are molded of silicone rubber or any other rubber material and thus have no rigidity. Thus, when the batteries 4 and 5 are inserted into the case main body 2, if the rubber flat plate part GB formed extending between the batteries 4 and 5 from the joint portion of the battery fixing parts 51 and 52 exists only, the rubber flat plate part GB may become deformed.

Specifically, when the batteries are inserted into the case main body 2, the rubber flat plate part GB is pushed in together with the batteries 4 and 5 and the battery fixing parts 51 and 52 cannot be placed at the essential position or the rubber flat plate part GB formed between the batteries 4 and 5 is crammed into the back and the batteries 4 and 5 cannot be inserted.

To solve such problems, the battery housing device 100 of the invention has the side wall support part 53 provided by attaching the side wall support members 53a and 53b of rigid plate-like PC sheet components to all or a part of both faces of the rubber flat plate part GB formed extending between the batteries 4 and 5 from the joint portion of the battery fixing parts 51 and 52 of silicone rubber molded articles, thereby preventing rubber deformation when the batteries 4 and 5 are inserted and enabling the user to easily insert the batteries.

When the batteries 4 and 5 are inserted into the case, if the battery fixing parts 51 and 52 and the rubber flat plate part GB can be placed at the essential positions (bottom part of the case main body 2 and position where the bottom part of the battery electrically connected to the spring can be supported at the assembling time), the degree of the rigidity of the side wall support part 53 is not limited and the side wall support part 53 may be able to become deformed conforming to the rubber flat plate part GB.

Thus, the battery housing device 100 of the invention includes the side wall support part 53 having rigidity, whereby the batteries 4 and 5 can be supported in the length direction of the batteries in a state in which the battery fixing parts 51 and 52 (rubber) and the rubber flat plate part GB are placed at the essential positions (in a state in which deformation of the rubber flat plate part GB does not occur). Further, the rubber flat plate part GB supports a part of the outer peripheral surface of the battery in the width direction of the battery (presses in the radius direction of the battery, the battery side wall direction), whereby the battery housing device 100 becomes resistant to vibration and shock and can prevent performance degradation.

(Description of Assembling of Battery Housing Device)

An example of an assembling method of the battery housing device in FIG. 1 will be discussed with FIG. 2.

As shown in FIG. 2, the battery support 50 with the side wall support part 53 attached to one ends of the battery fixing parts 51 and 52 is assembled and fixed to the case main body 2 to which the plus pole coil spring 21a and the minus pole coil spring 22a are attached.

The batteries 4 and 5 are inserted into the case main body 2 from the length direction of the batteries and are attached to the battery support 50. At this time, the fixing members 51a to 51c and 52a to 52c of the battery fixing parts 51 and 52 of the battery support 50 clamp the bottom parts of the batteries 4 and 5 and the side wall support members 53a and 53b of the side wall support part 53 of the battery support 50 support the side walls of the batteries 4 and 5.

The cover 3 is placed so as to cover the batteries 4 and 5 and is fixed to the case main body 2 with a screw.

At this time, the plus pole of the battery 4 is connected to the plus pole coil spring 21a through the hole 51h of the battery fixing part 51. The minus pole of the battery 5 is connected to the minus pole coil spring 22a through the hole 52h of the battery fixing part 52.

The plus pole of the battery 4 is connected to the plus pole coil spring 21a and the minus pole of the battery 5 is connected to the minus pole coil spring 22a, whereby the batteries 4 and 5 are connected in series via the springs 21a and 22a.

The batteries 4 and 5 supply power from the connector parts 12 and 13 through the circuit board 6 including the minus pole coil spring 21b and the plus pole coil spring 22b.

Other Embodiments

In the battery housing device of the invention, the coil springs 21a, 21b, 22a, and 22b are used as members electrically connected to the plus poles and the minus poles of the batteries, but the embodiment is not limited to the mode. Plate springs 31a, 31b, 32a and 32b (not shown) may be used in place of the coil springs 21a, 21b, 22a, and 22b.

For example, the batteries 4 and 5 are connected in series via the plus pole plate spring 31a and the minus pole plate spring 32a and supply power from the connector parts 12 and 13 through the circuit board 6 including the minus pole coil spring 31b and the plus pole coil spring 32b.

Each of the minus pole plate springs 32a and 31b is formed with a convex part circumventing hole having a larger diameter than a convex part of the plus pole of the battery 4, 5 so that erroneous contact with the convex part can be circumvented.

In this case, the plus pole plate spring 31a and the minus pole plate spring 32a may be formed in one body.

Consequently, the battery fixing parts 51 and 52 press (support) batteries in the length direction of the batteries and further the side wall support part 53 supports a part of the outer peripheral surface of the battery in the width direction of the battery (presses in the radius direction of the battery, the battery side wall direction), whereby the battery housing device of the invention becomes resistant to vibration and shock and can prevent performance degradation of the batteries.

The battery housing device of the invention has the side wall support part 53 with the rigid side wall support members 53a and 53b attached to both faces of the rubber flat plate part GB formed extending between the batteries 4 and 5 from the joint portion of the battery fixing parts 51 and 52, whereby rubber deformation at the inserting time of the batteries 4 and 5 can be prevented and the batteries can be easily inserted.

The case main body 2 and the cover 3 are screwed and fixed or the screw is removed and batteries 4 and 5 can be attached and detached in the length direction of the batteries, whereby the battery housing device of the invention is effective in that the batteries can be easily replaced without fitting an O ring into the battery periphery and without adhering and fixing the batteries to the battery case with a sealant as in the related art.

If having a capacitor for ensuring electric capacitance at the instantaneous interruption time between a battery and a terminal is not permitted because of explosion proof standard, coil springs or plate springs are adopted as terminals on both pole sides of the battery, whereby the battery housing device of the invention is also effective in that the coil springs or the plate springs follow motion of the battery occurring at vibration acceleration not only in a stationary state, but also in a vibration state and contact can be always kept.

Therefore, there can be provided the battery housing device which do not cause instantaneous interruption or a contact failure between the battery and the terminal to occur and can prevent a contact error in the vibration state.

In the battery housing device of the invention, if a battery used for a product is erroneously inserted (inversely inserted), the plus pole of the battery is electrically insulated except for the convex part and the spring crest inner diameter of the cylindrical coil spring of the minus pole (or convex part circumventing hole formed in minus pole plate spring) is larger than the convex part of the battery plus pole and thus contact with the convex part (energization) does not occur.

Thus, to use the batteries for a wireless communication device in an erroneous insertion (inverse insertion) state, an overcurrent does not occur in the batteries and a failure of abnormal heating of the battery or liquid leakage does not occur in the battery housing device.

Second Embodiment

In the first embodiment of the battery housing device of the invention, the two batteries 4 and 5 are housed, but the number of housed batteries is not limited to two and a battery housing device wherein one or more batteries are housed in parallel may be adopted.

For example, to house only one battery, a battery support 50 includes a battery fixing part 51 and a side wall support part 53 joined to one end of the battery fixing part 51 and side wall support part 53 is formed like a plate extending in the length direction of the battery and comes in contact with a side wall of the battery for supporting the battery (not shown).

To house a plurality of (for example, three) batteries in parallel, the battery support 50 includes a plurality of battery fixing parts (three battery fixing parts 51, 52, and 54 (not shown)) and a plurality of side wall support parts 53 and 55 (not shown).

The battery fixing parts 51, 52, and 54 are arranged in a row and are joined at one end of another battery fixing part. The side wall support part 53 is formed like a plate extending in the length direction of the battery in all or a part of place where the batteries can come in contact with each other in the joint portion of the battery fixing parts 51 and 52.

The side wall support part 55 is formed like a plate extending in the length direction of the battery in all or a part of place where the batteries can come in contact with each other in the joint portion of the battery fixing parts 52 and 54.

Consequently, a plurality of battery fixing parts are arranged in a row, a plurality of side wall support parts are placed in all or a part of the joint portion of the battery fixing parts where the batteries can come in contact with each other, and further the battery fixing parts 51 and 52 press (support) batteries in the length direction of the batteries and further the side wall support part supports a part of the outer peripheral surface of the battery in the width direction of the battery (presses in the radius direction of the battery, the battery side wall direction), whereby the battery housing device of the invention becomes resistant to vibration and shock, can prevent performance degradation of the batteries, prevents rubber deformation at the battery insertion time, enables easily battery insertion, and can house a plurality of batteries in parallel.

A case main body and a cover are screwed and fixed or the screw is removed and the batteries can be attached and detached in the length direction of the batteries, whereby the battery housing device of the invention is effective in that the batteries can be easily replaced.

Third Embodiment

In the first embodiment of the battery housing device of the invention, the two batteries 4 and 5 are housed in a row in parallel, but the invention is not limited to the mode. A battery housing device wherein a plurality of batteries are arranged in a plurality of rows may be adopted.

For example, to house a plurality of (for example, four) batteries in a plurality of rows, a battery support 50 includes a plurality of battery fixing parts (four battery fixing parts 51, 52, 54, and 56 (not shown)) and a plurality of side wall support parts 53, 55, 57, and 58 (not shown).

The battery fixing parts 51, 52, 54, and 56 are arranged in two rows of a row of the battery fixing parts 51 and 52 and a row of the battery fixing parts 54 and 56. The battery fixing parts 51, 52, 54, and 56 are joined at least at one end of another battery fixing part.

The side wall support part 53 is formed like a plate extending in the length direction of the battery in all or a part of the joint portion of the battery fixing parts 51 and 52 where the batteries can come in contact with each other.

The side wall support part 55 is formed like a plate extending in the length direction of the battery in all or a part of the joint portion of the battery fixing parts 54 and 56 where the batteries can come in contact with each other.

The side wall support part 57 is formed like a plate extending in the length direction of the battery in all or a part of the joint portion of the battery fixing parts 51 and 54 where the batteries can come in contact with each other.

The side wall support part 58 is formed like a plate extending in the length direction of the battery in all or a part of the joint portion of the battery fixing parts 52 and 56 where the batteries can come in contact with each other.

Consequently, the battery housing device of the invention has the battery support with a plurality of battery fixing parts arranged in a plurality of rows and a plurality of side wall support parts installed in all or a part of the place where the batteries can come in contact with each other, whereby the battery housing device becomes resistant to vibration and shock, can prevent performance degradation of the batteries, prevents rubber deformation at the battery insertion time, enables easily battery insertion, and can house a plurality of batteries arranged in a plurality of rows.

A case main body and a cover are screwed and fixed or the screw is removed and the batteries can be attached and detached in the length direction of the batteries, whereby the battery housing device of the invention is effective in that the batteries can be easily replaced.

Fourth Embodiment

In the battery housing device of the invention, a battery fixing part may be further placed in a cover 3 and a top face of a battery may be clamped for fixing the battery. Accordingly, the battery housing device becomes resistant to vibration and shock and can prevent performance degradation of the batteries.

While certain embodiments have been described, these embodiments have been presented by way of example only, and are not intended to limit the scope of the invention. Indeed, the novel device described herein may be embodied in a variety of other forms; furthermore, various omissions, substitutions and changes in the form of the device, described herein may be made without departing from the sprit of the invention. The accompanying claims and their equivalents are intended to cover such forms or modifications as would fall within the scope and sprit of the invention.

What is claimed is:

1. A battery housing device comprising: a case configured to house a battery and having a plus terminal and a minus terminal; a plus pole spring provided in the case and having one end connected to the plus terminal and an opposite end configured to come in contact with a plus pole of the battery; a minus pole spring provided in the case and having one end connected to the minus terminal and an opposite end configured to come in contact with a minus pole of the battery; and a battery support configured to support a bottom face of the battery and to support a side wall of the battery, wherein the battery support comprises: at least one battery fixing part comprising a hole through which one of the plus pole spring or the minus pole spring is connected to the battery, and comprising a plurality of fixing members configured to be placed in a margin of the bottom face of the battery and to support the bottom face of the battery when the battery is inserted, and at least one side wall support part, wherein the at least one side wall support part is a flat plate extending in a length direction of the battery, joined to one end of the battery fixing part, and a surface of the flat plate is configured to come in contact with the side wall of the battery to support the battery, wherein the battery can be attached to and detached from the battery support in the length direction of the battery, and wherein the plurality of fixing members surround the margin of the bottom face of the battery and press and clamp the battery in a radius direction of the battery.

2. The battery housing device as claimed in claim 1 wherein the case is configured to house two batteries in parallel, wherein
    the battery support comprises two battery fixing parts joined at one end to each other, and wherein
    the side wall support part joins with a joined portion of the battery fixing parts and is formed like the plate extending in the length direction of the battery in all or a part of place where the batteries can come in contact with each other.

3. The battery housing device as claimed in claim 1 wherein the case is configured to house a plurality of batteries, wherein
    the battery support comprises a plurality of battery fixing parts and each of the battery fixing parts is joined at least at one end of another battery fixing part, and wherein
    the battery support comprises a plurality of side wall support parts and each of the side wall support parts joins with at least any of the battery fixing parts in a joined portion of the battery fixing parts.

4. The battery housing device as claimed in claim 1 wherein the at least one battery fixing part is formed of a rubber material, and wherein
    the side wall support part comprises a flat plate formed of a rubber material and rigid side wall support members attached to a part or all of both faces of the flat plate.

5. The battery housing device as claimed in claim 1 wherein the case comprises
    a first case member wherein the battery support is disposed, the first case member comprising at least either the minus pole spring or the plus pole spring; and
    a second case member comprising at least either the plus pole spring or the minus pole spring, and wherein
    after the battery support is inserted into the first case member, the battery is inserted into the first case member, and then the first case member and the second case member are fixed.

6. The battery housing device as claimed in claim 1, wherein the at least one battery fixing part presses and clamps the battery in a length direction of the battery.

7. The battery housing device as claimed in claim 1,
    wherein the at least one side wall support part comprises two side wall support members and a rubber flat plate part, and
    each of the two side wall support members is attached to both faces of the rubber flat plate part respectively in a state that its entire surface is in contact with the rubber flat plate part.

* * * * *